US 9,964,099 B2

(12) United States Patent
Cassanelli (10) Patent No.: US 9,964,099 B2
(45) Date of Patent: May 8, 2018

(54) DEVICE FOR HOLDING AND DEPLOYING APPARATUS FOR USE IN SPACE

(71) Applicant: AEREA S.p.A., Turate (IT)

(72) Inventor: Ruggero Cassanelli, Arluno (IT)

(73) Assignee: AEREA S.P.A., Turate (CO) (IT)

( * ) Notice: Subject to any disclaimer, the term of this patent is extended or adjusted under 35 U.S.C. 154(b) by 415 days.

(21) Appl. No.: 15/085,279

(22) Filed: Mar. 30, 2016

(65) Prior Publication Data

US 2016/0290323 A1 Oct. 6, 2016

(30) Foreign Application Priority Data

Mar. 31, 2015 (IT) .................. 102015000010459

(51) Int. Cl.
| | | |
|---|---|---|
| B64G 1/64 | (2006.01) | |
| F03G 7/06 | (2006.01) | |
| B64G 1/22 | (2006.01) | |
| B64G 1/44 | (2006.01) | |

(52) U.S. Cl.
CPC ............. *F03G 7/065* (2013.01); *B64G 1/222* (2013.01); *B64G 1/44* (2013.01)

(58) Field of Classification Search
CPC  F03G 7/06; F03G 7/065; B64G 1/222; B64G 1/641; B64G 1/645; F16B 1/0014
See application file for complete search history.

(56) References Cited

U.S. PATENT DOCUMENTS

| | | | | |
|---|---|---|---|---|
| 5,771,742 A | * | 6/1998 | Bokaie | B64G 1/22 337/140 |
| 6,298,662 B1 | * | 10/2001 | Vezain | B64G 1/222 60/527 |
| 6,450,725 B1 | * | 9/2002 | Roth | B64G 1/222 294/86.4 |
| 2002/0102130 A1 | * | 8/2002 | Nygren | B64G 1/645 403/337 |
| 2003/0128491 A1 | * | 7/2003 | Bueno Ruiz | B64G 1/222 361/115 |

FOREIGN PATENT DOCUMENTS

FR 2973778 A1 * 10/2012 ............. B64G 1/222

* cited by examiner

*Primary Examiner* — Jonathan Matthias
(74) *Attorney, Agent, or Firm* — Heslin Rothenberg Farley & Mesiti P.C.; Victor A. Cardona, Esq.

(57) ABSTRACT

A device for holding and deploying apparatus for use in space includes a fixed body and a movable body coaxially connected to each other through balls displaceable from a retention position to a release position, and a shape memory alloy actuator remote-controllable to displace the balls from the retention position to the release position and the ensuing separation of the moveable body from the fixed body under the action of axial thrust elastic means. The shape memory alloy actuator consists of a torsionally-deformable bar.

12 Claims, 9 Drawing Sheets

DEVICE FOR HOLDING AND DEPLOYING APPARATUS FOR USE IN SPACE

CROSS-REFERENCE TO RELATED APPLICATIONS

This application claims priority to Italian Patent application No. 102015000010459 filed on Mar. 31, 2015, the entire disclosure of which is incorporated herein by reference.

FIELD OF THE INVENTION

The present invention refers to devices for holding and deploying apparatus for use in the space, such as for example solar panels and the like. Devices thus made typically include a fixed body constrained to a satellite intended to put in the orbit, and a mobile body constrained to the apparatus. The mobile body can be deployed or separated from the fixed body through a remote controllable actuator.

STATE OF THE PRIOR ART

Currently known hold and deploy devices of this type generally utilise, for deploying or separating the moveable body from the fixed body, pyrotechnic systems based on the detonation of small explosive charges. These systems reveal one or more of the following drawbacks:
- actuation characterised by a high mechanical shock with potential impact on the functionality of the apparatus placed onboard on the satellite,
- release of pollutant material (solid, liquid or gaseous) and material that could potentially interfere with the onboard optical apparatus,
- checking the preload level is uneconomical and subjected to uncertainty elements,
- impossibility to operate manually,
- provision and use subjected to ITAR regulations (satellite exportation limitations),
- reset operations that can be carried out only at the premises of equipment supplier, with ensuing impact on costs, times and reliability,
- reset operations requiring the replacement of parts of the system, with impact on costs, times and reliability even in this case,
- limited number of implementations, if not just one.

With the aim of overcoming these drawbacks, it was proposed to replace the pyrotechnic systems with different type of mechanisms, even with the use of shape memory alloy (SMA) actuators. A solution of this type is described and illustrated in document EP-1191271 which provides for a remote controllable retention and release mechanism that utilises, as a shape memory material alloy (SMA) actuator, one or more wires whose remote controlled heating causes the contraction thereof. Such contraction frees the rotation of a disc due to which a torsion helical spring, which normally radially fastens the sectors of a nut in which a retention screw of the apparatus is screwed, is charged thus allowing the radial opening of the nut sectors and the ensuing disengagement of the retention screw. The disc is normally locked in rotation by a crown, driven in rotation by the wires made of shape memory material, through retention balls that can be radially disengaged from the disc following the rotation of the crown. This solution is not only very complex from a construction point of view but also poorly reliable from a functional point of view.

A similar solution is described and illustrated in document JPH07187094 according to which a nut fastened with a bolt that connects the fixed body to the moveable body is formed by two radial portions on which a shape memory alloy spiral is wound. When the spiral is heated, it expands and releases the nut from the bolt, thus allowing the separation of the moveable body from the fixed body.

Though these solutions allow overcoming some of the problems mentioned beforehand, such as for example the disengagement of the moveable body without releasing material and with relatively low mechanical shocks, the reliability thereof is precarious, even due to the difficulty of efficiently controlling the actuation energy.

Another application of a shape memory alloy actuator in the space industry is known from document EP-1068447, according to which in order to control a relative rotation between two elements around a common axis there is provided a shape memory alloy torsional bar having a shape that directly connects such elements. In order to prevent the relative rotation angle from exceeding a predetermined critical value, a so-called mechanical fuse configured to break should such angle be exceeded, is interposed between the torsional bar and one of the elements. This system neither provides for nor allows the controlled separation between the two elements connected by the shape memory alloy torsional bar.

The known use of a torsional bar as shape memory alloy actuator for the hold and deploy of space apparatus is also provided for in the documents briefly discussed below.

"SHAPE MEMORY ALLOY REVERSIBLE HINGE FOR DEPLOYMENT APPLICATIONS"—Moignier: this publication regards a presentation at the 8th ESMATS (European Space Mechanisms And Tribology Symposium) conference, held in Toulouse, France, in 1999, which describes the use, since 1995 by the French company Matra Marconi Space, of an SMA torsional bar for developing the actuation torque required for deploying space apparatus. The document describes the application of the SMA torsional bar and a reversible hinge, with a fixed part and a moveable part directly interconnected by the torsional bar.

U.S. Pat. No. 5,975,468 on behalf of Matra Marconi Space, published in 1999, also describes the use of an SMA torsional bar as a rotary actuator for displacing solar panels space vehicles. Even in this case, the torsional bar is directly connected to the mutually rotary parts, through thermally insulating interface end elements.

Also U.S. Pat. No. 6,065,934 on behalf of The Boeing Company published in 2000 describes a rotary actuator for aerospace application formed by a tubular bar with associated super elastic return spring.

Document U.S. Pat. No. 4,798,051 on behalf of The Boeing Company published in 1989 probably chronologically represents the first document showing the use of an SMA torsional bar as a rotary actuator meant, considering the field of operation of the company and the field in which the company owner of the patent operated back then, for use in the aerospace industry.

SUMMARY OF THE INVENTION

The object of the present invention is to provide a device for holding and deploying apparatus for use in the space that is not only capable of overcoming the drawbacks revealed by the pyrotechnic systems, but also capable of allowing the optimal exploitation of the characteristics of shape memory alloy materials in a safe and reliable manner, with particularly small overall dimensions, and especially configured so as to be reutilised for several actuations.

According to the invention, this object is mainly attained through a holding and deploying device of the type defined in the pre-characterising part of claim 1, and generally corresponding to the prior art represented by the aforementioned document U.S. Pat. No. 5,975,468, characterised in that the fixed body and the moveable body are axially connected to each other through coupling members displaceable through said deformable torsional bar from a retention position for coupling the moveable body to the fixed body to a release position for separating the moveable body from the fixed body under the action of axial thrust elastic means.

According to a preferred embodiment of the invention, the fixed body includes a rotatable spool driven in rotation by the deformable torsional bar, and the bar is torsionally connected to such spool in a one-directional fashion, only in the direction of rotation corresponding to the release of coupling members but not in the opposite direction.

According to a further advantageous characteristic of the invention, the axial thrust elastic means acting on the moveable body comprise a preload spring and a kick-off spring independent from each other and with differentiated action. The preload spring is configured to apply to the movable body a greater axial force for a short stroke while the kick-off spring is configured to apply to the movable body a lower axial force for a longer stroke compatible with separation thereof with respect to the fixed body.

Thanks to the aforementioned characteristics, alongside others to be outlined hereinafter, the holding and deploying device according to the invention allows attaining the advantages listed below:
- disengaging the moveable body without generating mechanical shocks and without releasing materials,
- possibility of visibly indicating the applied pre-load,
- possibility to operate manually,
- automatically performable holding function,
- reset operations (return from the release condition to the retention condition after an apparatus release operation) in a simple and quick manner, without having to demount or replace the components,
- small axial overall dimension of the device as a whole and ensuing ease of installation in the limited space usually available between the satellite and the panel,
- high actuation repeatability.

BRIEF DESCRIPTION OF THE DRAWINGS

The invention will now be described in detail, purely by way of non-limiting example, with reference to the attached drawings, wherein.

DETAILED DESCRIPTION OF THE INVENTION

Figure 1:
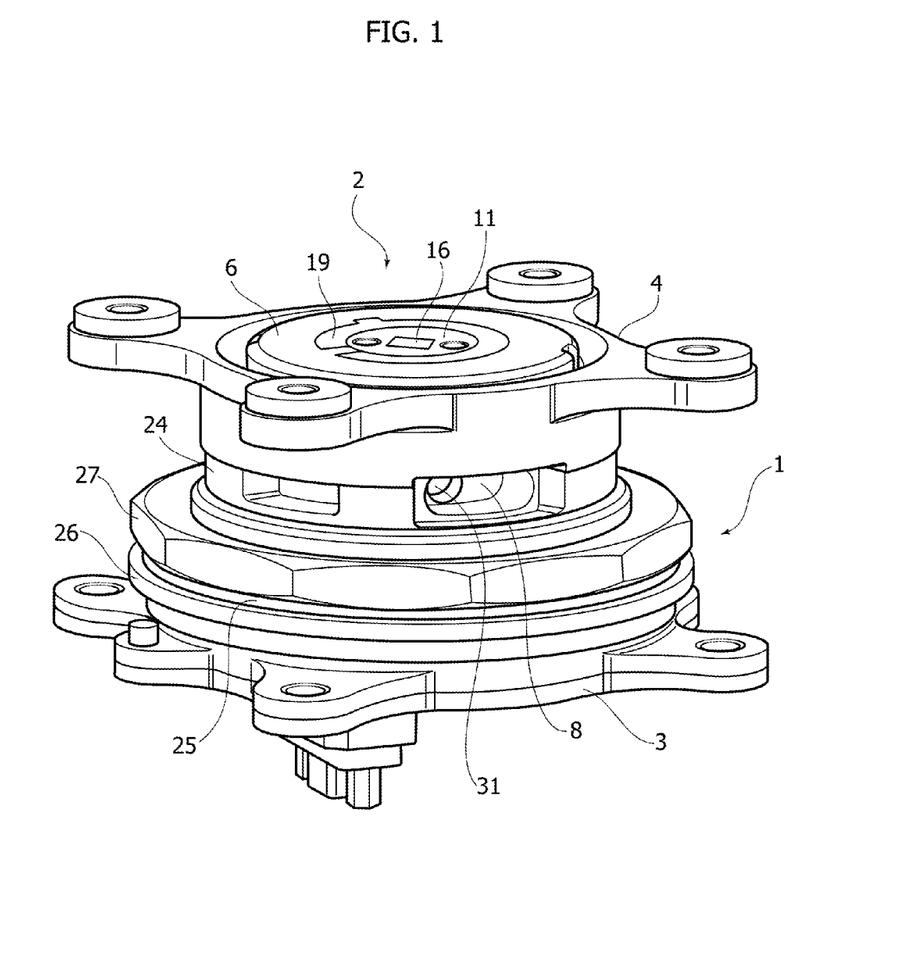
FIG. 1 is an overall perspective view of the holding and deploying device according to an embodiment of the invention, represented in the engaged configuration of the moveable body with respect to the fixed body.

The embodiment of the device for the holding and deploying the apparatus for use in space represented in the drawings essentially comprises a fixed body 1 and a moveable body 2 coaxially connected to each other in a separable fashion and provided with respective flanges 3, 4 for example for fixing to a satellite and a solar panel. The fixed and moveable bodies 1, 2 are held integrally joined to each other in the steps of launching and putting in orbit, as represented in FIG. 1, and thus disengaged to allow deployment of the solar panel.

The fixed body 1 comprises a substantially cylindrical retention cable element 5 whose end portion 6, opposite to the flange 3, is formed on the lateral wall thereof with a crown of equally-spaced angularly radial holes 7.

In such end part 6 of the retention element 5 there is coaxially inserted a hollow spool 8 formed with a crown of recesses 9 equally-spaced angularly like the radial holes 7. A crown of balls 10 cooperates with the holes 7 and the recesses 9 as outlined more in detail hereinafter: As observable hereinafter, such balls 10 constitute coupling members displaceable from a retention position to a release position of the moveable body 2 due to the controlled rotation of the spool 8 around the axis of the device.

Figure 7:
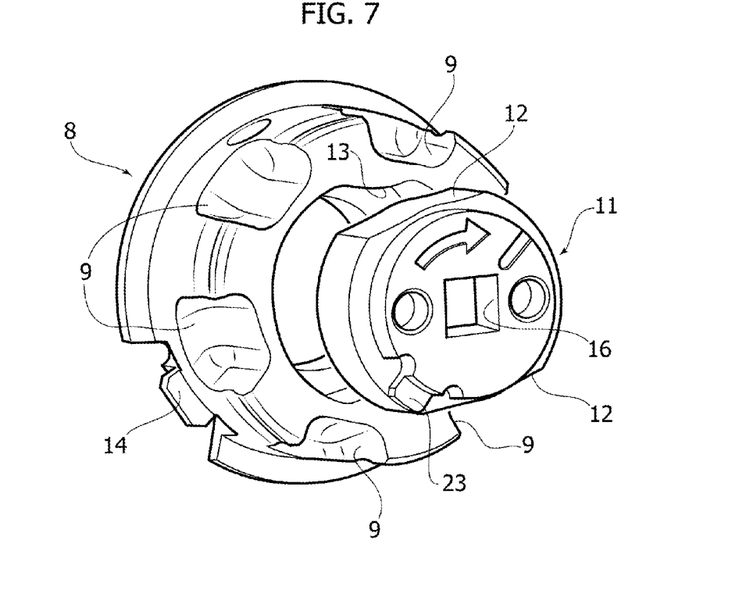
FIG. 7 shows two components of FIG. 6, in larger scale.

An actuator body coaxially inserted in the spool 8 and coupled thereto in rotation through respective driving planes 12, 13 is indicated in its entirety with 11 (FIG. 7).

Figure 10:
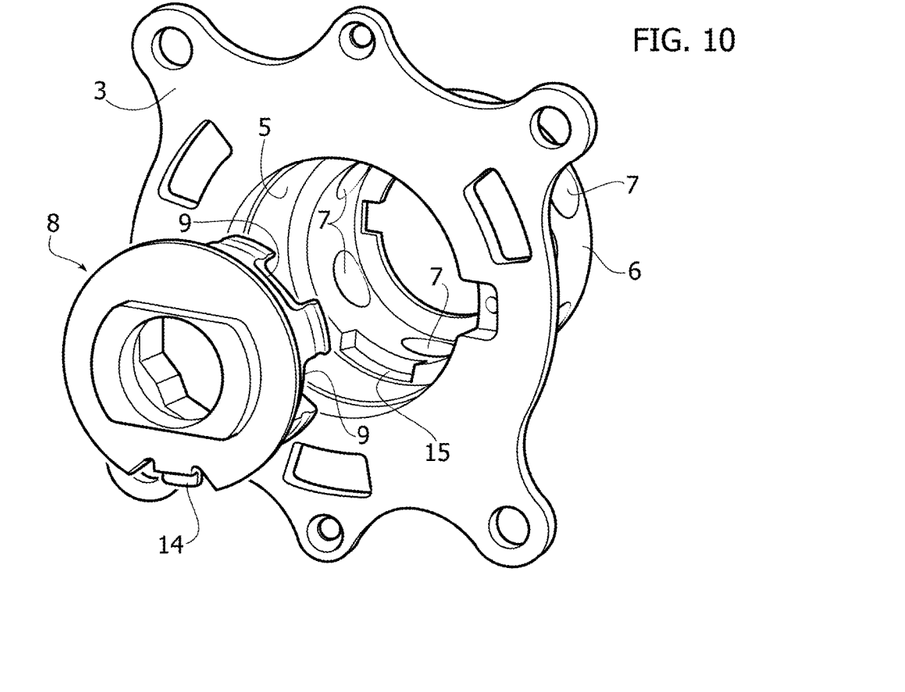
FIG. 10 is a dorsal perspective view of two components of FIG. 6.

The spool 8 is rotatable in the portion 6 of the retention element 5 for an angular field limited by the engagement between a radial tooth 14 of the spool 8 and a cavity 15 formed in the portion 6 (FIG. 10).

Figure 2:
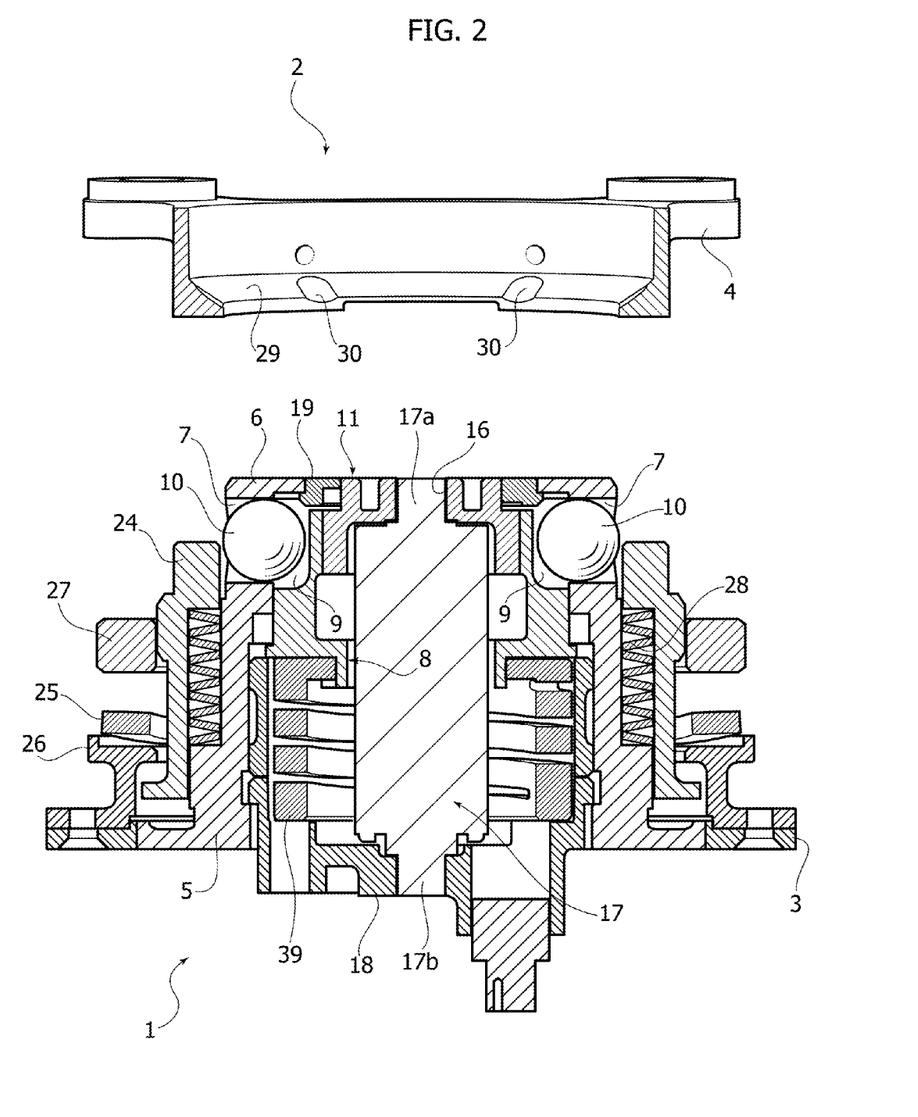
FIG. 2 is an axial sectional view showing the device in the released condition of the moveable body.
Figure 3:
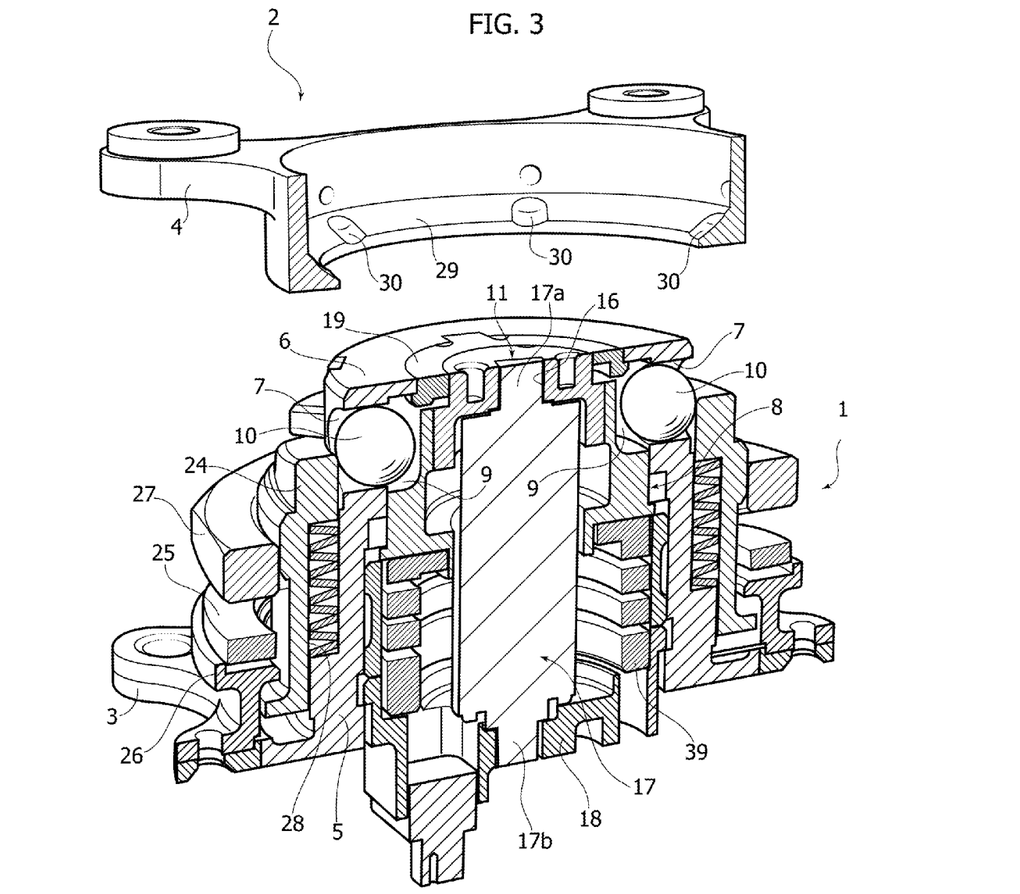
FIG. 3 is a perspective view of the section of FIG. 2, rotated by 180°.

The actuator body 11 centrally has a through square hole 16 in which there is engaged a complementary-shaped end 17a of a cylindrical bar made of SMA material 17, for example a nickel-titanium alloy, which coaxially extends through the retention element 5 and whose opposite end 17b is anchored to a bottom 18 (FIGS. 2 and 3). Such SMA bar 17 constitutes the remote controllable actuator to obtain the controlled separation of the moveable body 2 from the fixed body 1.

A torsion helical spring 39, whose function will be clarified hereinafter, surrounds part of the SMA bar 17 and it is anchored at the ends thereof respectively to the spool 8 and to the bottom 18.

Figure 8:
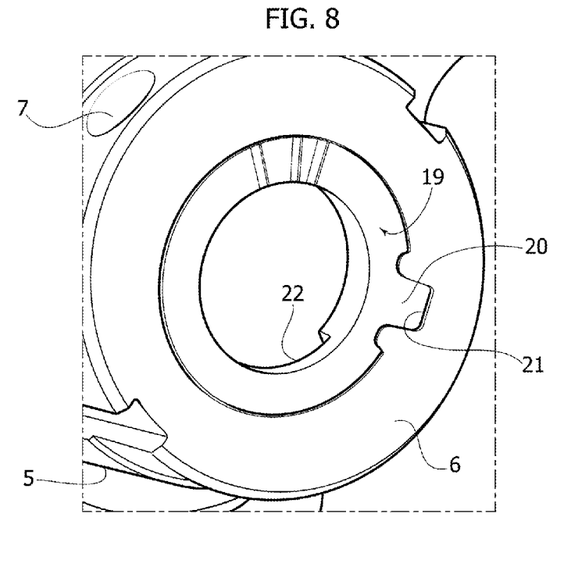
FIG. 8 is a top perspective view, simplified and in larger scale, of part of the fixed body.
Figures 9A, 9B:
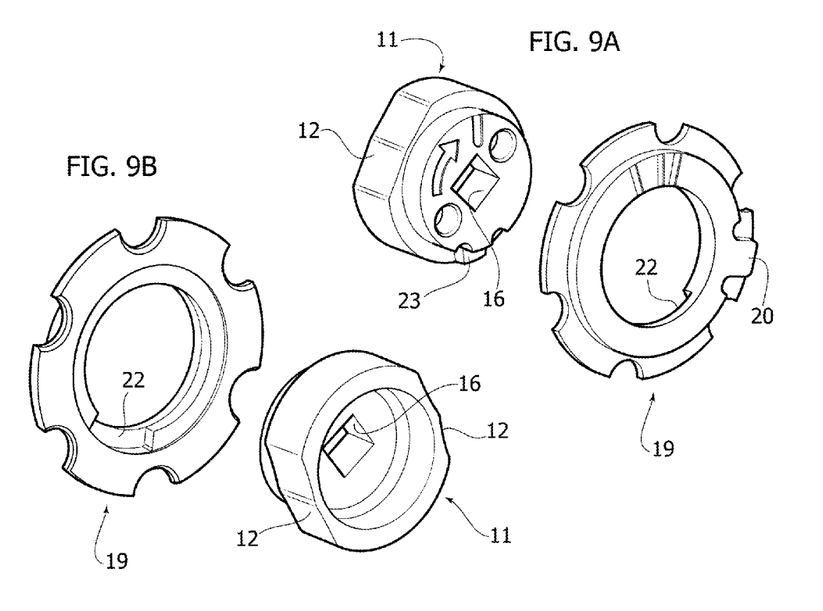
FIG. 9A illustrates two components of FIG. 6, in larger scale and detail.
FIG. 9B is a dorsal view of FIG. 9A.

A sliding fifth-wheel applied to the end portion 6 of the retention element 5 and against which the spool 8 slides during the rotation thereof is indicated with 19. The fifth-wheel 19 is locked in rotation with respect to the retention element 5 through a radial tooth 20 engaged in a cavity 21 of the end part 6 (FIG. 8) and it in turn has an inner angular cavity 22 through which there is engaged a radial tooth 23 of the actuator body 11 (FIGS. 9A and 9B) to limit the angular rotation field of such body 11 starting from a reset position.

Figure 16:
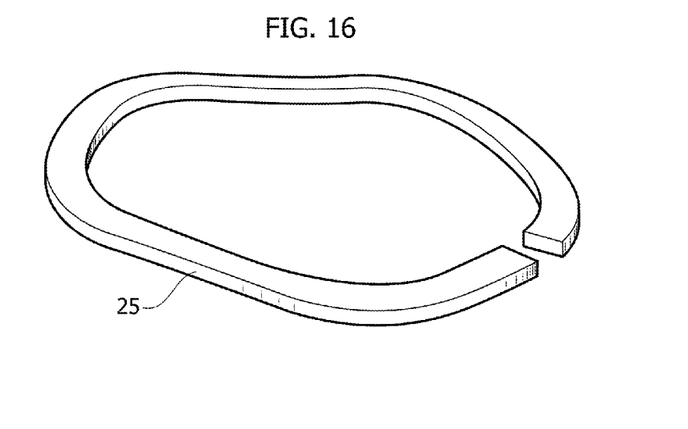
FIG. 16 is a perspective view and in larger scale, of a further component of the device.

A sleeve with thrust function arranged coaxially outside the retention element 5 and axially moveable with respect to the latter is indicated with 24 (FIGS. 1-3). Such pusher sleeve 24 is subjected to the action of two different elastic members independent with respect to each other and with differentiated action. The first elastic member consists in a preload spring 25, represented in detail in FIG. 16, formed by an undulated elastic ring interposed between an annular flange 26 integrally joined to the retention element 5 and a preload ring nut 27 carried in an axially adjustable fashion by the push member 24. The second elastic member consists in a Belleville washer pack 28 with kick-off function interposed between the push member 24 and the retention element 5.

The load developed by the preload spring 27 can be selected and visually identified through the angular position of the ring nut 27: in particular, the maximum load corresponding to the total deformation of the spring 25 is attained through a rotation of the ring nut 27 equivalent to one turn, so that a positioning error for example by 10° with respect to the visual target leads to an applied preload variation below 3%.

The preload spring 25 is capable of applying to the push member 24 a relatively high axial load (for example in the order of 4000 N) with a limited axial stroke (for example in the order of about 1 mm), while the kick-off spring 28 is configured to apply to the push member 24 a lower axial force but for a greater axial stroke. These effects and the relative advantages shall be outlined further in detail hereinafter.

Figure 4:
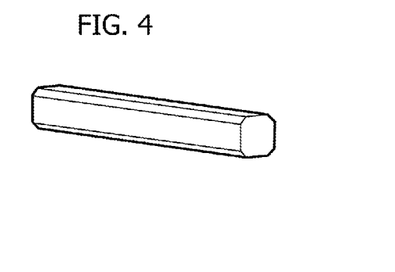
FIGS. 4 and 5 are perspective views exemplifying the operation of a torsional deformable SMA bar.
Figure 5:
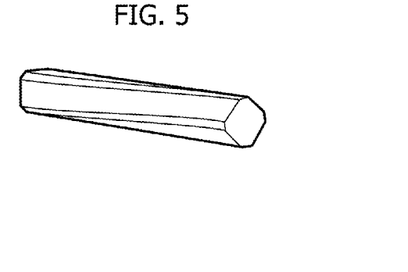
Figure 6:
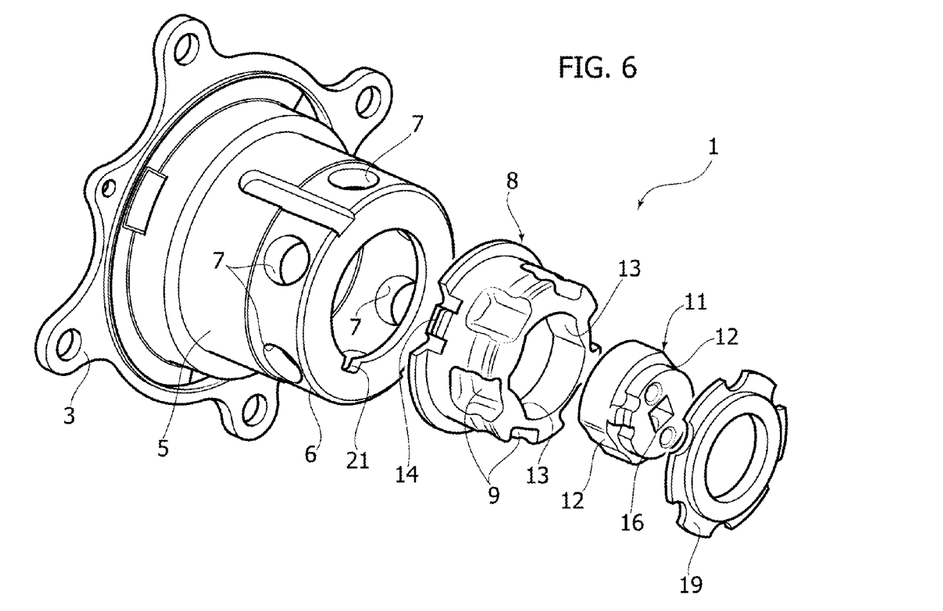
FIG. 6 is an exploded perspective view of part of the fixed body of the device.

FIGS. 4 and 5 schematically exemplify, with reference to a simple SMA prismatic bar with constant square section 17, the operation of the shape memory alloy bar 17. As known, shape memory alloys represent a class of metal materials in which there is a phase transformation to solid phase (i.e. in which both the initial phase and the final phase are solid structures, even though with different crystallographic patterns) referred to as thermoelastic martensitic transformation. In particular, their main characteristic lies in being capable of recovering a preset macroscopic shape due to the simple change of temperature or state of applied stress.

According to the invention, the SMA bar 17 is deformable by torsion: it is subjected to a specific torsional deformation at room temperature at martensitic conditions in advance, as schematised in FIG. 5. Thus, the bar 17, following the transformation of the martensitic phase to austenitic phase obtained by heating it at a temperature higher than the phase transformation one returns to the normal undeformed condition schematised in FIG. 4, recovering the previous torsional deformation set in martensitic conditions.

The heating is obtained due to the Joule effect, through a normal heater for example directly integrated in the SMA bar 17 and provided with a circuit for limiting the absorbable power, of the generally conventional type and thus not described in detail herein, capable of preventing overheating phenomena and excess consumption of electrical power. The heater can be easily remote controlled in an equally conventional fashion.

As observable hereinafter, the torsional deformation induced in the SMA bar 17 controllably rotates the actuator body 11, and thus the spool 8, against the action of the torsional spring 39 and for a limited angular width delimited by the cavity 15 in which the tooth 14 is moveable, as well as by the cavity 22 of the sliding fifth-wheel 19 in which the tooth 23 of the actuator body 11 is moveable.

Figure 11:
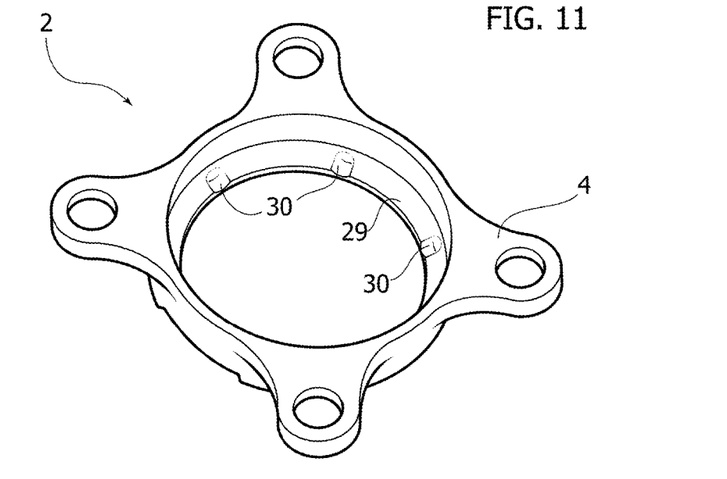
FIG. 11 is a perspective view of the moveable body of the device, in smaller scale.

The moveable body 2, illustrated in its entirety in FIG. 11, has an annular configuration and, in the engagement condition represented in FIG. 1, it coaxially surrounds the end portion 6 of the retention element 5. The base of the moveable body 2 is formed in a annular slanted groove 29 fashion having a crown of cavities with spherical-cylindrical surface 30 angularly equally spaced for reducing the state of Hertzian stress induced in the moveable body 2 of the balls 10.

Figures 12, 13:
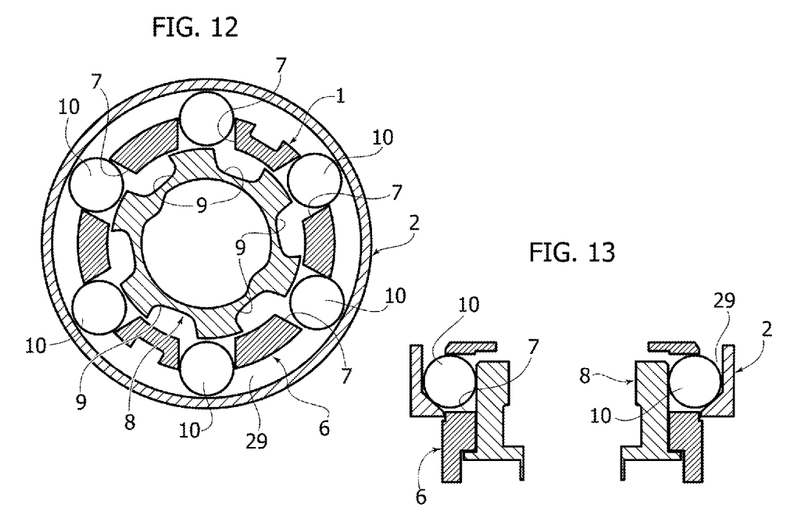
FIGS. 12, 13 and 14, 15 are schematic views, respectively in transversal section and axial section, exemplifying the detachment of the moveable body from the fixed body of the device.
Figure 14:
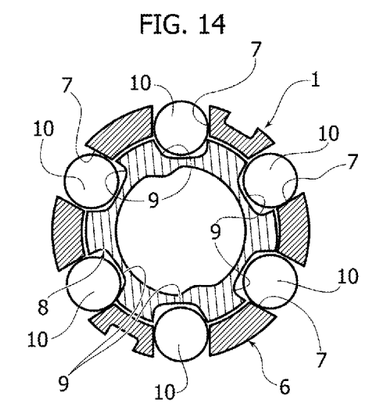
Figure 15:
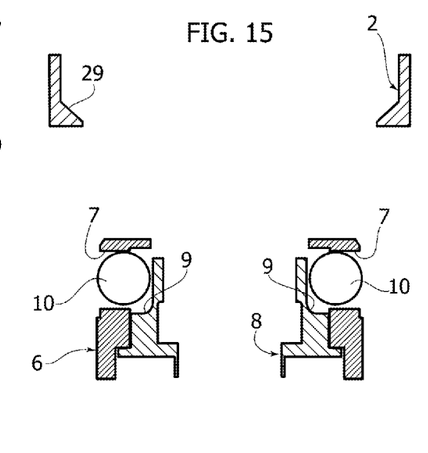

In the engagement condition of the device represented in FIG. 1, the moveable body 2 is axially locked with respect to the fixed body 1 due to the coupling carried out by the balls 10, as schematised in FIGS. 12 and 13. In such condition, the moveable body 2 is subjected, through the push member 24, to the action of the preload spring 25 and the kick-off springs 28. When the coupling action carried out by the balls 10 is eliminated, as explained and schematised hereinafter in FIGS. 14 and 15, the moveable body 2 is axially unconstrained from the fixed body 1 and it is disengaged therefrom by the axial thrust exerted by the push member 24.

The operation of the holding and deploying device according to the invention shall now be described in detail.

As mentioned above, in the engagement condition represented in FIG. 1 and schematised in FIGS. 12 and 13, the balls 10 are held in a radially extracted coupling position between the spool 8 and the moveable body 2: the angular position of the spool 8 is in this case such that the recesses 9 are angularly offset with respect to the balls 10, which partly project from the holes 7 of the end part 6 of the retention element 5, resting on the slanted surface 29 of the moveable body 2. This condition, in which the SMA bar 17 is deformed in a martensitic fashion and not subjected to any stress, is maintained by the action of the torsion helical spring 39. The slanted surface 29, pushed against the balls 10 by the action of the preload spring 25 and the kick-off spring 28, applies an axial and radial load component to such balls 10.

In order to obtain the disengagement and separation of the moveable body 2 from the fixed body 1, i.e. the condition represented in FIGS. 2 and 3, the heater of the SMA bar 17 is remote-actuated, to cause the thermoelastic martensitic transformation and thus the torsional counter-deformation of the SMA bar 17 towards the initial undeformed shape. Due to such torsional recovery, the torque applied by the SMA bar 17 to the actuator body 11 is transmitted by the latter to the spool 8 which rotates from the angular position represented in FIG. 12 to the one illustrated in FIG. 14, in which the recesses 9 are aligned with the balls 10. Thus, the balls 10 translate radially from the extracted position to the recessed position in which they are disengaged from the slanted surface 29 of the moveable body 2. This radial recession of the balls 10, facilitated by the radial component of the thrust exerted by the push member 24 transmitted thereto by slanted surface 29, leads to the separation of the moveable body 2 from the fixed body 1 under the action of the preload spring 25, which, as mentioned, develops a high elastic force for a very short stroke, and the kick-off spring 28 which applies a load of lower intensity but which operates for a stroke compatible with the complete disengagement of the moveable body 2.

Figure 17:
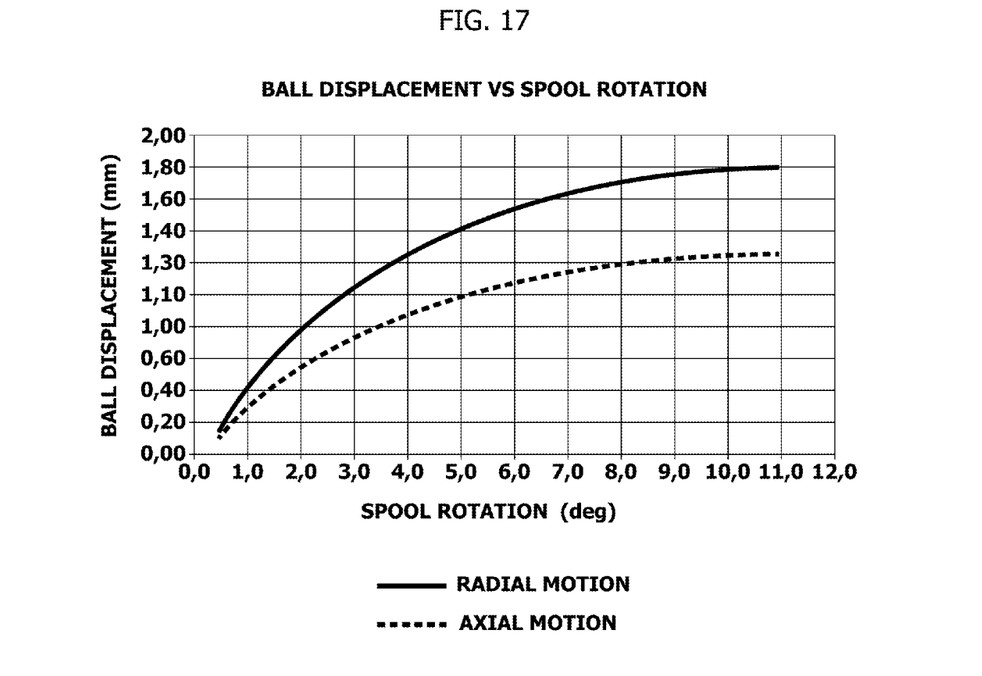
FIGS. 17 and 18 are diagrams exemplifying the operating mode of the device according to the invention.

In this step, the combined effect of the torsional deformation of the bar 17, which allows controlling the rotary motion of the spool and thus the radial return displacement of the balls 10, and the differentiated action of the springs 25 and 28 allows efficiently eliminating the generation of mechanical shocks: the diagram of FIG. 17 represents the relation between the displacement of the balls 10, respectively in the radial direction with solid line and in axial direction with dashed line, as a function of the rotation applied to the spool 8 due to the deformation of the SMA bar 17.

Figure 18:
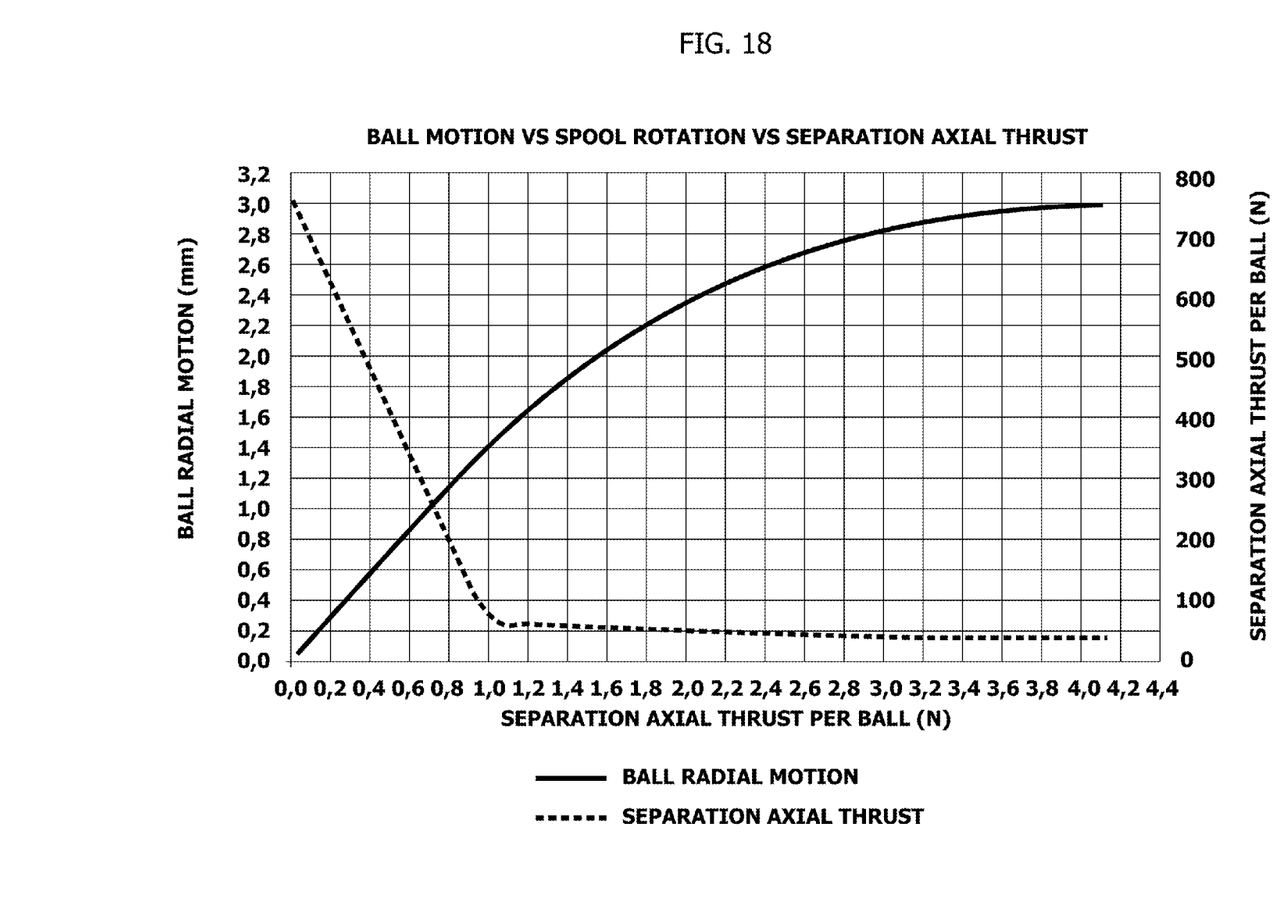

The chart of FIG. 18 represents the relation between the retraction radial motion of the balls 10 and the separation axial thrust applied to each ball 10 by the springs 25 and 28. As observable in this second diagram, the absence of shock at the maximum elongation of the kick-off spring 28 is guaranteed by the fact that the preload spring 25 exhausts its thrust much earlier than the SMA bar 17 and the balls 10 controlled thereby exhaust theirs, thus preventing the occurrence of impact phenomena. This advantageous effect is also a direct consequence of the relative slowness with which the SMA bar 17 recovers its undeformed condition, during the austenitic transformation thereof. In addition, given that the constraint between the SMA bar 17 and the spool 8 described previously is one-directional, i.e. configured so as to execute the mutual torsional coupling only in the direction corresponding to the release of the moveable body 2, the SMA bar 17 can be once again pre-deformed to prepare it for a new opening without affecting the state of the device, in particular with the moveable body 2 in engaged position. Basically, this allows carrying out both the reset operation on the SMA bar 17 on the ground and manually operate the device, to open and close, without modifying the state of such SMA bar 17. This also advantageously allows resetting the device already installed onboard the satellite, without replacing parts and in a simple and quick manner, by acting on the operating point obtained on the spool 8 and accessible externally, indicated with 31 in FIG. 1.

A further advantage of the hold and deploy device according to the invention lies in the possibility of potentially utilising it for a high number of actuations.

Obviously, the construction details and the embodiments may widely vary with respect to what has been described and illustrated, without departing from the scope of protection of the present invention as described in the claims that follow.

The invention claimed is:

1. A device for holding and deploying apparatus for use in space, comprising:
a fixed body and a movable body coaxially connected to each other in a separable fashion by means of a remote controllable shape memory alloy actuator,
the shape memory alloy actuator consisting of a torsionally-deformable bar,
axial thrust elastic means,
the fixed body and the movable body axially connected to each other by coupling members displaceable through said torsionally-deformable bar from a retention position for coupling the movable body to the fixed body to a release position for separating the movable body from the fixed body under an action of the axial thrust elastic means.

2. Device according to claim 1, wherein the fixed body includes a rotatable spool driven in rotation by said torsionally-deformable bar so as to enable displacement of said coupling members from the retaining position to the releasing position.

3. Device according to claim 2, wherein said coupling members comprise a crown of balls moveable from a radially extracted position to a radially retracted position relative to the spool.

4. Device according to claim 3, wherein the spool is formed with a crown of recesses which in a first angular position, corresponding to a geometry of said torsionally-deformable bar obtained following torsional deformation thereof at martensitic conditions, are angularly offset with respect to said balls which are held in said radially extracted condition, and in a second angular position corresponding to said torsionally-deformable bar having recovered an undeformed condition following austenitic transformation thereof, are angularly aligned with said balls arranged in said radially retracted condition.

5. Device according to claim 4, wherein said torsionally-deformable bar is torsionally connected to said spool in a direction corresponding to rotation thereof from said first angular position to said second angular position but not in the opposite direction.

6. Device according to claim 4, wherein in said radially extracted condition the balls rest against an annular slanted surface of the movable body so configured to apply to said balls the thrust of said elastic means according to an axial component and a radial component.

7. Device according to claim 6, wherein said annular slanted surface is provided with spherical-cylindrical cavities configured to reduce the Hertzian stress state induced by said balls to the movable body.

8. Device according to claim 1, wherein said elastic means comprise a preload spring and a kick-off spring independent from each other and providing a differentiated action.

9. Device according to claim 8, wherein said preload spring is configured to apply a greater axial force for a short stroke to the movable body, and said kick-off spring is configured to apply to the movable body a lower axial force for a longer stroke compatible with separation of the movable body from the fixed body.

10. Device according to claim 9, wherein the preload spring consists of an undulated elastic ring interposed between an annular flange of the fixed body and an outer ring nut applied in an adjustable fashion to an axial push member acting on the movable body.

11. Device according to claim 9, wherein the kick-off spring consists of a Belleville washer pack.

12. Device according to claim 1, wherein said torsionally-deformable bar comprises a remotely controlled Joule-effect heater designed to operate thermoelastic martensitic transformation of said bar and provided with a circuit for limiting the power which can be absorbed so as to inhibit overheating phenomena and excessive electrical power consumption.

* * * * *